April 28, 1959 B. SHLACHTER 2,884,485
TELEVISION RECEIVER
Filed March 8, 1955
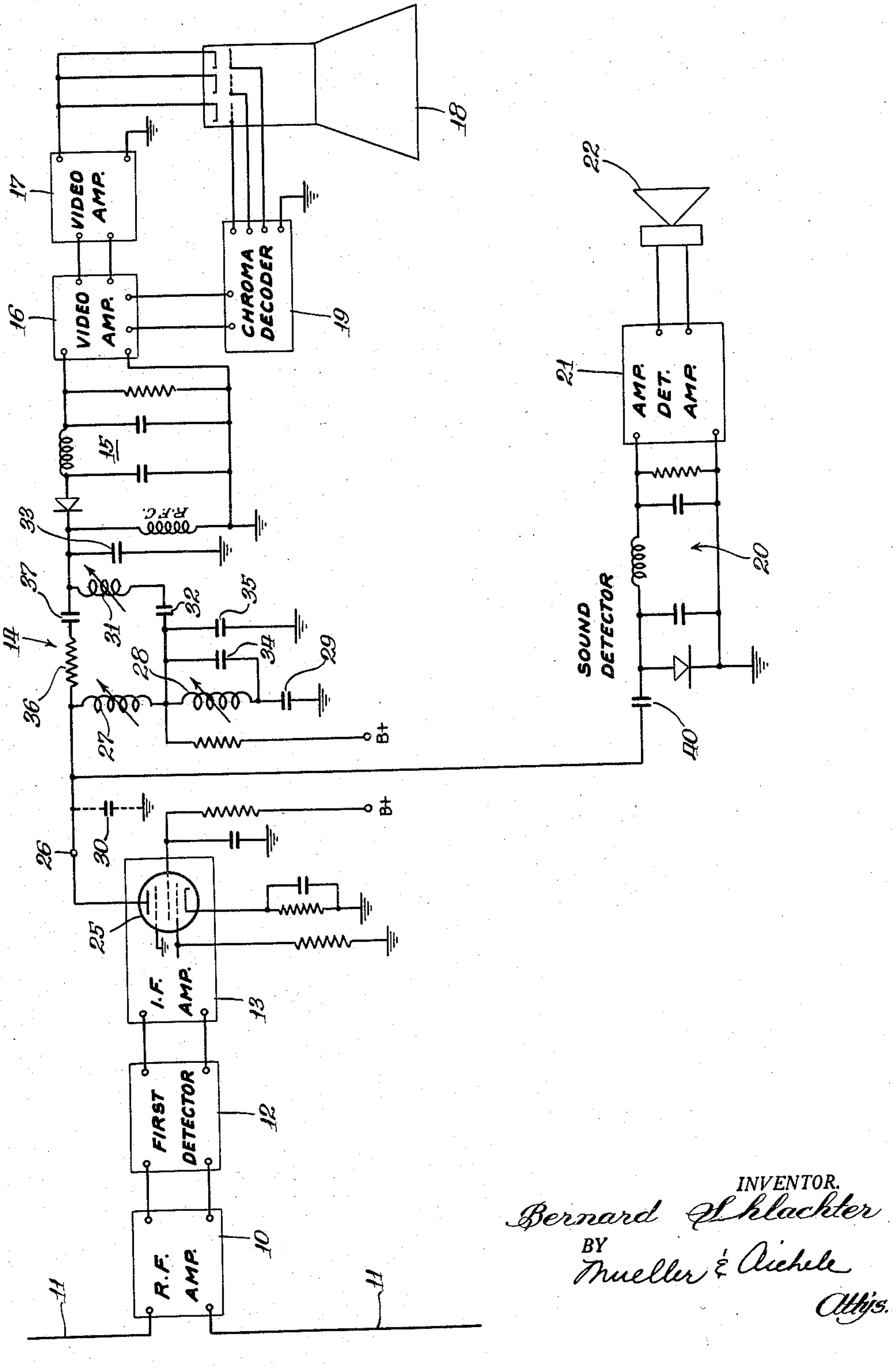
INVENTOR.
Bernard Shlachter
BY
Mueller & Aichele
Attys.

United States Patent Office 2,884,485

Patented Apr. 28, 1959

2,884,485

TELEVISION RECEIVER

Bernard Shlachter, Chicago, Ill., assignor to Motorola, Inc., Chicago, Ill., a corporation of Illinois Application March 8, 1955, Serial No. 492,958

2 Claims. (Cl. 178—5.8)

This invention relates to television, and more particularly to an improved coupling circuit for use in a television receiver for directing the picture carrier of a received television signal into its individual channel with a minimum of cross-talk or other interference from the sound carrier.

The usual intercarrier sound principle has been utilized extensively in recent monochrome television receivers because of the economy that can be realized thereby. In this system a common intermediate frequency amplifier is used for the sound and picture carriers, and a beat signal frequency modulated by the sound information is recovered at the second detector. This general system, however, is not particularly satisfactory in present day color receivers due to the proximity of the sound carrier and the chrominence subcarrier in the color television signal. This proximity has a tendency to generate a beat note at the second detector that can give rise to interference in the normal intercarrier system. To obviate this condition, it has been proposed to modify the system by using separate detectors for the different components of the color television signal. For example, systems have been proposed in which one detector is used for the luminance signal and another for the sound and chrominance signal. With this arrangement, the beat note from the sound and chrominance signals can be conveniently kept out of the luminance channel.

In the receiver of the present invention, it is contemplated that one detector be used for the picture carrier to recover both the luminance information and the chrominance subcarrier, and that another detector be used for the sound carrier; and the invention provides an improved coupling circuit for feeding the modulated intermediate frequency picture carrier from the common intermediate frequency channel to the picture detector with minimum interference from the sound signal.

It is, accordingly, an object of the present invention to provide in a television receiver an improved coupling network for translating the components of a received television signal from a common channel to individual channels in the receiver.

Another object of the invention is to provide such a coupling network that operates with a high degree of efficiency so as to reduce cross-talk and other interference between the channels to a minimum.

Yet another object of the invention is to provide such a coupling network that uses relatively few and readily available components so as to be economical and commercially practical in its construction.

A feature of the invention is the provision of a coupling network between a common channel and individual channels of a receiver for feeding a modulated signal in the common channel to its individual channel; and which network includes a primary circuit and a secondary circuit, with a series-resonant network forming a common coupling impedance therebetween; which resonant network acts as a trap for one of the signals to prevent its being translated to the secondary circuit.

Another feature of the invention is the provision in such a coupling network of a series impedance between the primary and secondary circuits to increase the effective attenuation of the series-resonant trap network to the trapped signal at the resonant frequency.

Yet another feature of the invention is the provision in such a coupling network of a capacitor in shunt with the inductive portion of the series-resonant network to decrease the physical size of the inductance unit necessary in that portion.

A still further feature of the invention is the provision in such a coupling network of a capacitor in shunt with the series-resonant trap network to control the pass band of the coupling network.

The above and other features of the invention which are believed to be new are set forth with particularity in the appended claims. The invention itself, together with further objects and advantages thereof, may best be understood by reference to the following description when taken in conjunction with the accompanying drawing in which the single figure shows a color television receiver incorporating the improved coupling circuit of the present invention.

The coupling circuit of the invention is intended primarily to be used in a television receiver of the superheterodyne type having a first detector and an intermediate frequency amplifier for producing in response to a received television signal a picture-modulated intermediate frequency carrier wave and a sound-modulated intermediate frequency carrier wave, and further having a sound channel and a picture channel. The coupling circuit comprises a parallel-resonant primary circuit tuned to pass the picture modulated carrier and including a first inductance coil and a series-resonant network which are series connected between an output terminal of the intermediate frequency amplifier and a point of reference potential, the series-resonant network being tuned to the frequency of the sound-modulated intermediate frequency carrier. The coupling circuit also includes a parallel-resonant secondary tuned to pass the picture-modulated carrier and including the series combination of a second inductance coil and the series-resonant network. The end of the second inductance coil remote from the series-resonant network is connected to the picture channel. Circuit means is also provided for coupling the end of the first inductance coil remote from the series-resonant network to an input terminal of the second channel.

The illustrated color television receiver includes a radio frequency amplifier 10 having input terminals connected to a suitable antenna 11, and having output terminals coupled through a first detector 12 to an intermediate frequency amplifier 13. The intermediate frequency amplifier is coupled through the coupling network 14 of the present invention to the picture channel of the receiver. This channel includes a detector 15 which is coupled through a pair of cascaded video amplifiers 16, 17 to the cathodes of a color cathode-ray image reproducer 18 illustrated as of the tri-gun type. Video amplifier 16 is coupled to a chroma decoder 19 of any usual type which is coupled to the control grids of reproducer 18.

The intermediate frequency amplifier 13 is also coupled to the sound channel of the receiver, and this channel includes a detector circuit 20 which recovers the frequency modulated sound signal. Detector 20 is coupled to a unit 21 which includes the usual amplifier and discriminator-detector stages, and this unit is connected to a sound reproducer 22.

The portions of the color television receiver shown in block form have no bearing on the invention insofar as the particular circuits used in these components is concerned, and any presently known circuits can be used for these components. It is believed unnecessary, therefore, for a clear understanding of the present inventions to show the particular circuits of such portions herein. The portions of the receiver coupled to the coupling circuit 14 are shown, in circuit form, however, and will now be described.

The final intermediate frequency amplifier stage is shown as including an electron discharge device 25 whose anode is connected to an output terminal 26 of the intermediate frequency amplifier 13. The coupling network 14 includes a primary circuit which, in turn, includes a first inductance coil 27 and a series-resonant network (including an inductance coil 28 and a capacitor 29) connected in series between the output terminal 26 and a point of reference potential or ground.

The distributed capacity of the output circuit of device 25 and associated circuitry (which is designated by the capacitor 30) tunes the primary circuit and forms a parallel-resonant circuit, and the inductive portions of the primary circuit are adjustable to tune the primary circuit to a selected frequency, as will be described.

The coupling network 14 also includes a second inductance coil 31 which is coupled through a blocking capacitor 32 to the series-resonant network 28, 29 to form a series combination therewith. The secondary circuit is tuned by capacitor 33 which may be a physical circuit element or which may be the distributed and stray capacitance associated with the input circuit of detector 15, and the secondary circuit is tuned thereby to form a parallel-resonant network whose frequency is adjustable by varying the inductance of coil 31.

It will be noted that the series-resonant network 28, 29 forms a common impedance between the primary and secondary circuits of coupling network 14. That is, the signal appearing across the series-resonant network portion 28, 29 of the primary circuit is coupled by that portion into the secondary circuit to appear across it and the second inductance coil 31. Only when a signal appears across the series-resonant network is a corresponding signal translated to the secondary circuit.

The inductance coil 28 in the series-resonant network is shunted by a capacitor 34 which increases the effective inductance of the series-resonant network at the resonant frequency and allows for a smaller physical coil to be used for inductance unit 38, purely for economy reasons. A capacitor 35 is shunted across the entire series-resonant network 28, 29 to reduce the impedance thereof and provide a proper pass band for the coupling network 14 between the intermediate frequency amplifier 13 and video detector 15.

At the resonant frequency of series-resonant network 28, 29 there is a resistance to ground due to the quality factor (Q) of that circuit. It is desired to reduce the effect of this resistance as much as possible so as to increase the attenuation of the series-resonant network. This is accomplished by the provision of resistor 36 which is connected from the top end of inductance coil 27 through a blocking capacitor 37 to the top end of inductance coil 31. As the signal applied through the series resonant network to the picture detector is reversed in phase, the resistor 36 couples an out-of-phase voltage to the video or picture detector which effectively increases the attenuation of resonant network 28, 29 at the resonant frequency.

The output terminal 26 of the intermediate frequency amplifier is coupled through a capacitor 40 to the sound detector 20 of the receiver.

When the radio frequency amplifier 10 is tuned to a color television signal, such signal is heterodyned by first detector 12 to produce in intermediate frequency amplifier 13 a picture-modulated intermediate frequency carrier wave. This carrier includes the luminance components and the chrominance subcarrier component of the color television signal. A sound-modulated intermediate frequency carrier wave is also produced in the amplifier 13. These two intermediate-frequency carrier waves appear at the output terminal 26 of the intermediate frequency amplifier. The primary circuit including elements 27, 28, 29 and distributed capacity 30, is tuned to be parallel resonant at the frequency of the picture-modulated carrier, and the secondary circuit including elements 31, 28, 29 and distributed capacity 33 is also tuned to be parallel-resonant at the frequency of the picture carrier. The series-resonant network 28, 29, on the other hand, is tuned to be series-resonant at the frequency of the sound-modulated carrier wave. The network 14, therefore, functions as a double-tuned coupling network for the picture-modulated carrier and translates this carrier from terminal 26 to the video detector 15, the picture-modulated carrier being translated from the primary circuit to the secondary circuit by virtue of the common series-resonant network 28, 29 across which this carrier appears. Since the series-resonant network 28, 29 is tuned to the sound carrier, it offers a low impedance to ground to that carrier so that the sound carrier appears thereacross greatly attenuated to be effectively trapped from the secondary circuit. As previously noted, this attenuation is increased by the provision of resistor 36 which feeds the sound carrier with reverse phase to the secondary circuit so as to cancel the attenuated carrier supplied to the secondary through series-resonant network 28, 29.

The sound-modulated carrier appearing at terminal 26 is fed to the sound detector 20, and the picture-modulated carrier, which also appears at this terminal, is removed from the sound channel by suitable and usual trap circuits (not shown) in that channel. Although the series-resonant network 28, 29 traps the sound modulated carrier from the secondary circuit, sufficient signal appears across the primary circuit so that it may be fed to the sound channel with sufficient amplitude for satisfactory sound reproduction.

The invention provides, therefore, a simple and efficient coupling network for use in a television receiver, particularly in a color television receiver, that enables the picture-modulated intermediate frequency carrier to be fed from the common intermediate-frequency amplifier to the picture channel of the receiver with minimum interference from the sound-modulated carrier.

I claim:

1. In a television receiver having an intermediate frequency amplifier and a picture channel, and wherein a picture-modulated intermediate frequency carrier wave and a sound-modulated intermediate frequency carrier wave appear at the output of the intermediate frequency amplifier, a coupling circuit for applying only the picture modulated carrier wave to the input of the picture channel, said coupling circuit including in combination, a primary circuit portion and a secondary circuit portion which circuit portions have a common terminal and a common coupling network connected from said common terminal to a reference potential, said network including a coupling capacitor connected from said common terminal to said reference potential and a series resonant network connected from said common terminal to said reference potential, said series-resonant network being tuned to the frequency of said sound-modulated carrier wave, said primary circuit portion including a first inductance coil separate from said series resonant network connected from the output of the intermediate frequency amplifier to said common terminal, said primary circuit portion being parallel-resonant and tuned to the frequency of the picture-modulated carrier wave, said secondary circuit including a second inductance coil independent of said series-resonant network and connecting said common terminal to the input of the picture channel, said secondary circuit portion being parallel resonant and tuned to the frequency of the picture-modulated carrier wave, whereby the picture modulated carrier wave is applied through said coupling circuit to the picture channel and the sound modulated carrier wave is reversed in phase by said coupling circuit and attenuated by the low impedance path to said reference potential presented by said series-resonant network, and a bridge circuit portion including resistance bridged across said first and second inductance coils for passing a portion of the sound-modulated carrier wave, said portion of said sound modulated carrier wave applied through said bridge circuit portion being out of phase with the sound modulated carrier wave applied through said series resonant network to cancel out the same.

2. In a television receiver having an intermediate frequency amplifier and a picture channel, and wherein a picture-modulated intermediate frequency carrier wave and a sound-modulated intermediate frequency carrier wave appear at the output of the intermediate frequency amplifier, a coupling circuit for applying only the picture modulated carrier wave to the input of the picture channel, said coupling circuit including in combination, a primary circuit portion and a secondary circuit portion which circuit portions have a common terminal and a common coupling network connected from said common terminal to a reference potential, said network including a coupling capacitor connected from said common terminal to said reference potential and a series resonant network connected from said common terminal to said reference potential, said series-resonant network including an inductor and a capacitor connected in series with an additional capacitor bridged across said inductor, said series-resonant network being tuned to the frequency of said sound-modulated carrier wave, said primary circuit portion including a first inductance coil separate from said series resonant network connected from the output of the intermediate frequency amplifier to said common terminal, said primary circuit portion being parallel-resonant and tuned to the frequency of the picture-modulated carrier wave, said secondary circuit including a second inductance coil independent of said series-resonant network and connecting said common terminal to the input of the picture channel, said secondary circuit portion being parallel resonant and tuned to the frequency of the picture-modulated carrier wave, whereby the picture modulated carrier wave is applied through said coupling circuit to the picture channel and the sound modulated carrier wave is reversed in phase by said coupling circuit and attenuated by the low impedance path to said reference potential presented by said series-resonant network, and a bridge circuit portion including resistance bridged across said first and second inductance coils for passing a portion of the sound-modulated carrier wave, said portion of said sound modulated carrier wave applied through said bridge circuit portion being out of phase with the sound modulated carrier wave applied through said series resonant network to cancel out the same.

References Cited in the file of this patent

FOREIGN PATENTS 706,066 Great Britain ---------- Mar. 24, 1954

OTHER REFERENCES

Publication, "Rider Television Manual," vol. 3, Motorola, pages 23 and 24.